US012658693B2

(12) United States Patent
Rogers et al.

(10) Patent No.: US 12,658,693 B2
(45) Date of Patent: Jun. 16, 2026

(54) REMOVABLE SURGE PROTECTOR CONFIGURED FOR STANDARD ELECTRICAL ENCLOSURE

(71) Applicant: Metra Electronics Corporation, Holly Hill, FL (US)

(72) Inventors: Adam Rogers, Holly Hill, FL (US); Stewart Denton, Holly Hill, FL (US)

( * ) Notice: Subject to any disclaimer, the term of this patent is extended or adjusted under 35 U.S.C. 154(b) by 611 days.

(21) Appl. No.: 18/071,726

(22) Filed: Nov. 30, 2022

(65) Prior Publication Data

US 2024/0178661 A1 May 30, 2024

(51) Int. Cl.
| | |
|---|---|
| *H01C 7/12* | (2006.01) |
| *H01R 13/66* | (2006.01) |
| *H01R 25/00* | (2006.01) |
| *H02H 1/00* | (2006.01) |
| *H02H 1/04* | (2006.01) |
| *H02H 3/22* | (2006.01) |
| *H02H 9/04* | (2006.01) |
| *H02H 9/06* | (2006.01) |

(52) U.S. Cl.
CPC ......... *H02H 9/044* (2013.01); *H01R 13/6666* (2013.01); *H01R 25/006* (2013.01); *H02H 9/042* (2013.01)

(58) Field of Classification Search
CPC .... H02H 9/044; H02H 9/042; H01R 13/6666; H01R 25/006
USPC ........................................................ 361/118
See application file for complete search history.

(56) References Cited

U.S. PATENT DOCUMENTS

| | | | | |
|---|---|---|---|---|
| 4,688,135 A | * | 8/1987 | Leopold | H01R 13/6666 |
| | | | | 361/111 |
| 2007/0181328 A1 | * | 8/2007 | Dinh | H02G 3/121 |
| | | | | 174/50 |
| 2009/0180261 A1 | * | 7/2009 | Angelides | H01R 13/7135 |
| | | | | 361/728 |
| 2017/0245341 A1 | * | 8/2017 | Lee | H05B 47/19 |

* cited by examiner

*Primary Examiner* — Crystal L Hammond
*Assistant Examiner* — Lucy M Thomas
(74) *Attorney, Agent, or Firm* — J. Wiley Horton

(57) ABSTRACT

A surge protector that can be mounted in a standard electrical enclosure—such as a double gang enclosure. The surge protector includes one or more removable surge protection modules. The surge protection modules are accessible through the front of the surge protector. The removable module can be removed and replaced without dismounting the surge protector.

6 Claims, 9 Drawing Sheets

REMOVABLE SURGE PROTECTOR CONFIGURED FOR STANDARD ELECTRICAL ENCLOSURE

BACKGROUND OF THE INVENTION

1. Field of the Invention

This invention relates to the field of electrical power distribution. More specifically, the invention comprises a surge protector incorporating a replaceable surge protection module. The surge protector is configured to mount within a standard electrical enclosure, such as a double gang enclosure.

2. Description of the Related Art

It is well known that electronic devices can be damaged by surges in AC line power. For this reason, it is common to provide a surge protector between an electrical outlet and the electronic device. Surge protectors are now commonly used with televisions, streaming devices, routers, computers, and the like. Some surge protectors incorporate a removable and replaceable module. The inclusion of a replaceable module allows the surge protector to be restored to service when it is depleted by the absorption of significant power surges.

Prior art surge protectors evolved primarily from power strips where a single cord feeds power to an elongated strip with multiple receptacles. These devices traditionally rested on the floor or on a shelf, so the form factor was not very important. In recent years, however, the mounting of a flat television on a bare wall has become common. Streaming devices feeding a signal to the television are also mounted on the wall—often behind the television itself. In order to provide a "clean" look in which no cords are visible, a power outlet is often provided in the wall where the television is to be mounted. The outlet and the cords are then hidden by the television once it is installed.

Unfortunately, the desire for a clean look in which no cords are visible leaves little room for a surge protector. The present invention proposes a solution in which a surge protector can be provided within the existing television mounting and power systems. In order to understand the advantages provided by the invention, it is helpful for the reader to understand the nature of a standard electrical enclosure that is used to house the power distribution components feeding power to the television.

FIG. 1 shows an exemplary prior art electrical enclosure—double gang enclosure 10. Such an enclosure is usually attached to a wall stud. In the example shown, a pair of nails 16 are driven laterally into wooden stud 12 to mount the enclosure. Two standoffs 14 are provided so that front face 18 of the enclosure is displaced forward from the outward-facing side of the stud. This provides an adequate spacing for the thickness of the drywall used to create the finished wall surface. The finished drywall surface is then roughly co-planar with front face 18.

FIG. 2 shows the same configuration after drywall 22 has been added and finished. Opening 20 is cut through the drywall to provide access for enclosure 10. The reader will note how front face 18 lies approximately flush with the drywall. FIG. 3 shows the same enclosure after a pair of electrical conductors 28 have been pulled through two of the openings 26 provided in the enclosure. In this example, each electrical conductor 28 includes an insulated line lead ("hot lead"), an insulated neutral lead, and a bare ground lead (using American nomenclature). All these are contained within a surrounding insulated sheath.

Mounting receivers 24 are provided for the components that are typically mounted within enclosure 10. The components are usually switches or outlets. As an example, it is common to mount a pair of duplex electrical outlets in the enclosure. One duplex outlet can be mounted on the left side using the left upper and left lower mounting receivers 24. A second duplex outlet can be mounted on the right side using the right upper and right lower mounting receivers. Power can be provided to the duplex outlets using electrical conductors 28. Unless the outlets are the end of a chain of parallel connections, two conductors will usually be fed into the enclosure (as shown).

The enclosure's interior dimensions are somewhat standardized. The distances between the four mounting receivers 24 are more rigorously standardized. Such enclosures 10 are made so that numerous prior art components will fit within the available interior space and attach using the available mounting receivers.

The present invention provides a surge protector that can fit within the prior art enclosure 10 and preferably attach using mounting receivers 24.

BRIEF SUMMARY OF THE PRESENT INVENTION

The present invention provides a surge protector that can be mounted in a standard electrical enclosure—such as a double gang enclosure. The surge protector includes one or more removable surge protection modules. The surge protection modules are accessible through the front of the surge protector. The removable module can be removed and replaced without dismounting the surge protector.

Figure 1:
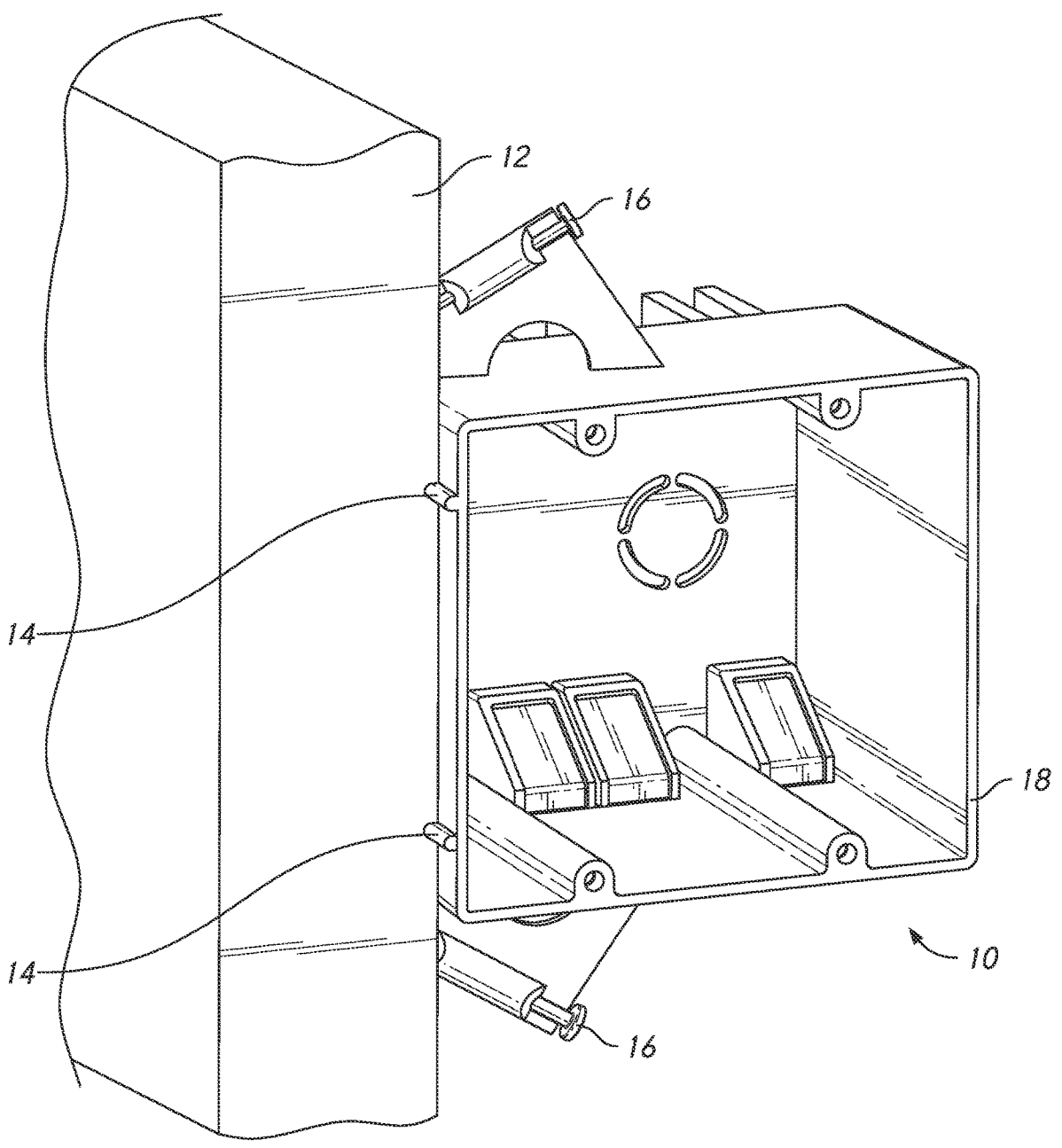
FIG. 1 is a perspective view, showing a prior art double gang enclosure attached to a wall stud.

REFERENCE NUMERALS IN THE DRAWINGS 10 double gang enclosure
12 stud
14 standoff
16 nail
18 front face
20 opening
22 drywall
24 mounting receiver
26 opening
28 electrical conductor
30 surge protector outlet
32 tab
34 hole
36 removable module
38 light
40 receptacle
42 receiver
44 ground connection
46 neutral connection
48 cover plate
50 receptacle opening
52 hole
54 contact
55 contact
56 screw
57 contact
58 module receiver
59 contact
60 test and control circuit
62 speaker
64 antenna
66 line conductor
68 neutral conductor
70 ground conductor
72 switch
74 control line
76 fixed MOV
78 surge protector outlet
80 integrated faceplate
82 removable module
84 light
86 release button
88 hole
90 body

DETAILED DESCRIPTION OF THE INVENTION

The present invention can be adapted for use in a wide variety of electrical enclosures and settings. The following detailed descriptions pertain to a few embodiments. Once having reviewed these descriptions, those skilled in the art will readily perceive many more embodiments. Accordingly, the scope of the invention should be fixed by the claims presented rather than the few embodiments described.

Figure 4:
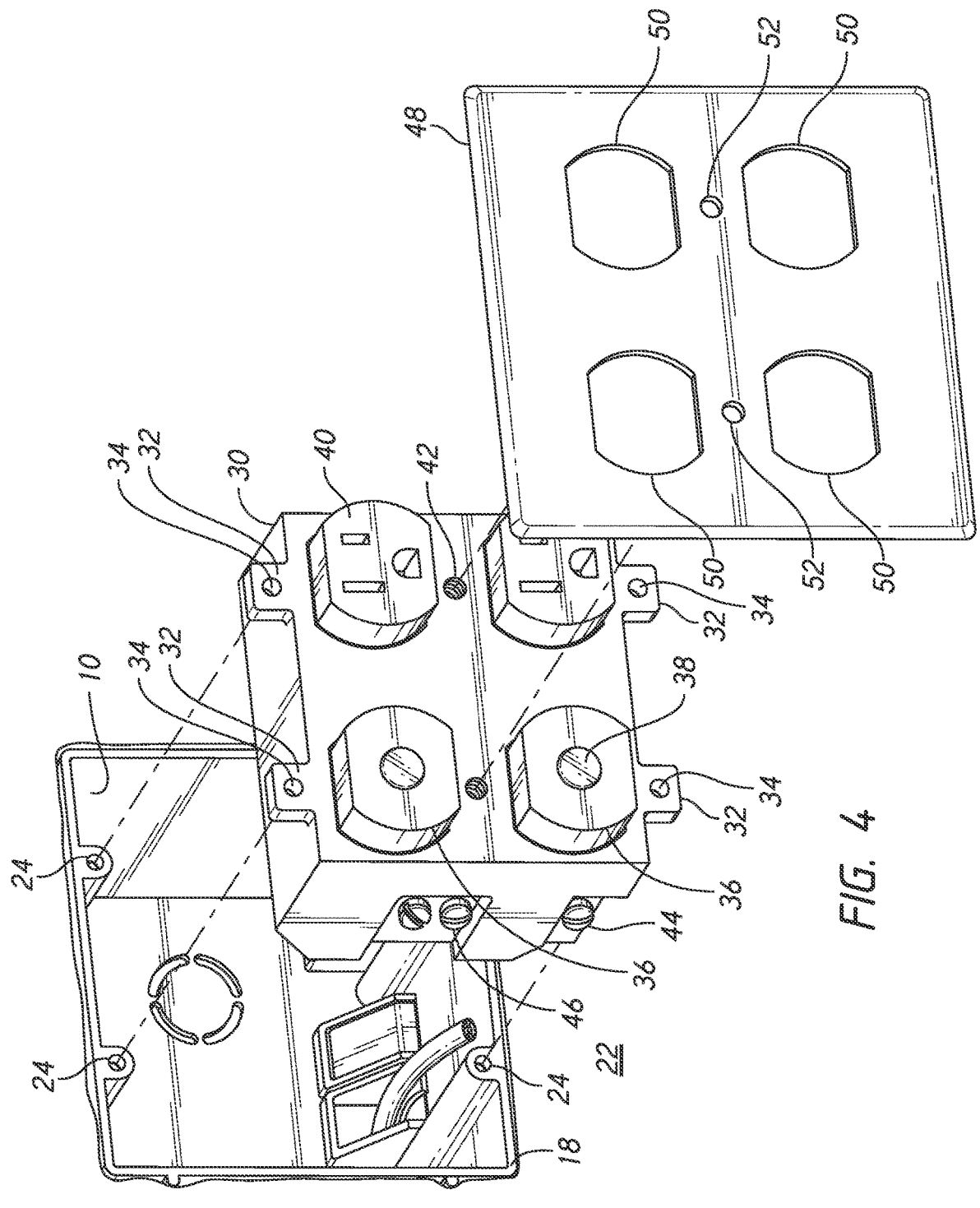
FIG. 4 is an exploded perspective view, showing an embodiment of the present invention.

FIG. 4 depicts an exploded view of an inventive embodiment adapted for use in a double gang electrical enclosure. As explained previously, the front face 18 of double gang enclosure 10 is approximately flush with the surface of drywall 22. The interior volume of the electrical enclosure opens into this front face. Such enclosures have an "axis of assembly" which is defined as a direction of travel in which components are to be attached to the enclosure. In the example shown, the axis of assembly is perpendicular to the surface of drywall 22. This axis of assembly allows a component to slide into the electrical enclosure while the electrical enclosure is mounted in the wall.

The inventive surge protector outlet 30 is configured to mount within the standard electrical enclosure. The embodiment shown is configured to mount within double gang enclosure 10. Four tabs 32 are provided on the surge protector outlet. Each tab 32 includes a hole 34. Standard mounting screws (not shown) can be passed through holes 34 and screwed into receivers 24 on double gang enclosure 10. This mounts the surge protector outlet within the enclosure.

The embodiment shown is designed to use a standard outlet cover plate 48. This is a desirable feature, since outlet cover plates are made in a wide variety of materials and colors in order to accommodate the decorative aesthetic of a room. The front portion of surge protector outlet 30 includes two threaded receivers 42. Once outlet 30 is installed within enclosure 10, cover plate 48 can be attached so the surge protector outlet by passing screws through holes 52 on cover plate 48 and into receivers 42. The protrusions on the front portion of surge protector outlet 30 are located and sized to fit within the standard receptacle openings 50 in cover plate 48.

The reader will note again that the axis of assembly for the double gang enclosure is perpendicular to the wall in which the enclosure is mounted (perpendicular to drywall 22). Surge protector outlet 30 slides into the hollow interior of enclosure 10 in a direction that is parallel to the axis of assembly. Likewise, cover plate 48 mounts to surge protector outlet 30 in a direction that is parallel to the axis of assembly.

Of course, electrical connections must be made during the assembly process and surge protector outlet 30 includes features accommodating this need. These are preferably standard mounting features so that an electrician installing the surge protector outlet will not need any new tools or training. In the embodiment of FIG. 4, two neutral connectors 46 are provided and a single ground connector 44 is provided. The connectors in this case are screws threaded into a mounting hole. As will be familiar to those skilled in the art, an electrician ordinarily strips a length of insulation from a neutral conductor. The stripped length is formed into a hook and passed under the head of one of the neutral connectors 46. The screw forming part of the neutral connector is then tightened to secure the loop. The ground conductor is likewise connected to ground connector 44. No stripping is needed in that case as the ground conductor is not insulated.

Line ("hot") connectors are provided on the opposite side of surge protector outlet 30. The line connectors are not visible to the user in FIG. 4, but they are a mirror image of the neutral connectors that are visible. Two neutral connectors and two line connectors are provided. The two line connectors are electrically connected to each other, as are the two neutral connectors. This feature allows both electrical conductors 28 (shown in FIG. 3) to be conveniently attached to the surge protector outlet as part of a parallel circuit, without having to make additional connections between the two electrical conductors 28.

The inventive embodiment of FIG. 4 provides a pair of surge-protected electrical receptacles 40 on the right side. These are provided in a standard location and spacing. In operation, a user plugs electronic equipment—such as a television and a streaming device—into these two surge-protected receptacles. The embodiment shown includes both fixed surge protection components and replaceable surge protection components.

The fixed surge protection components are contained within the interior of surge protector outlet 30. Two removable surge protector modules 36 are also provided. A portion of these removable modules is accessible in the front portion of the surge protector outlet and they are designed to be removed outward in a direction that is parallel to the axis of assembly. The removable modules preferably include some type of cue alerting the user that replacement is advisable. In the embodiment of FIG. 4, each removable module 36 includes an indicator light 38. The light illuminates to indicate that the removable module should be replaced.

Figure 5:
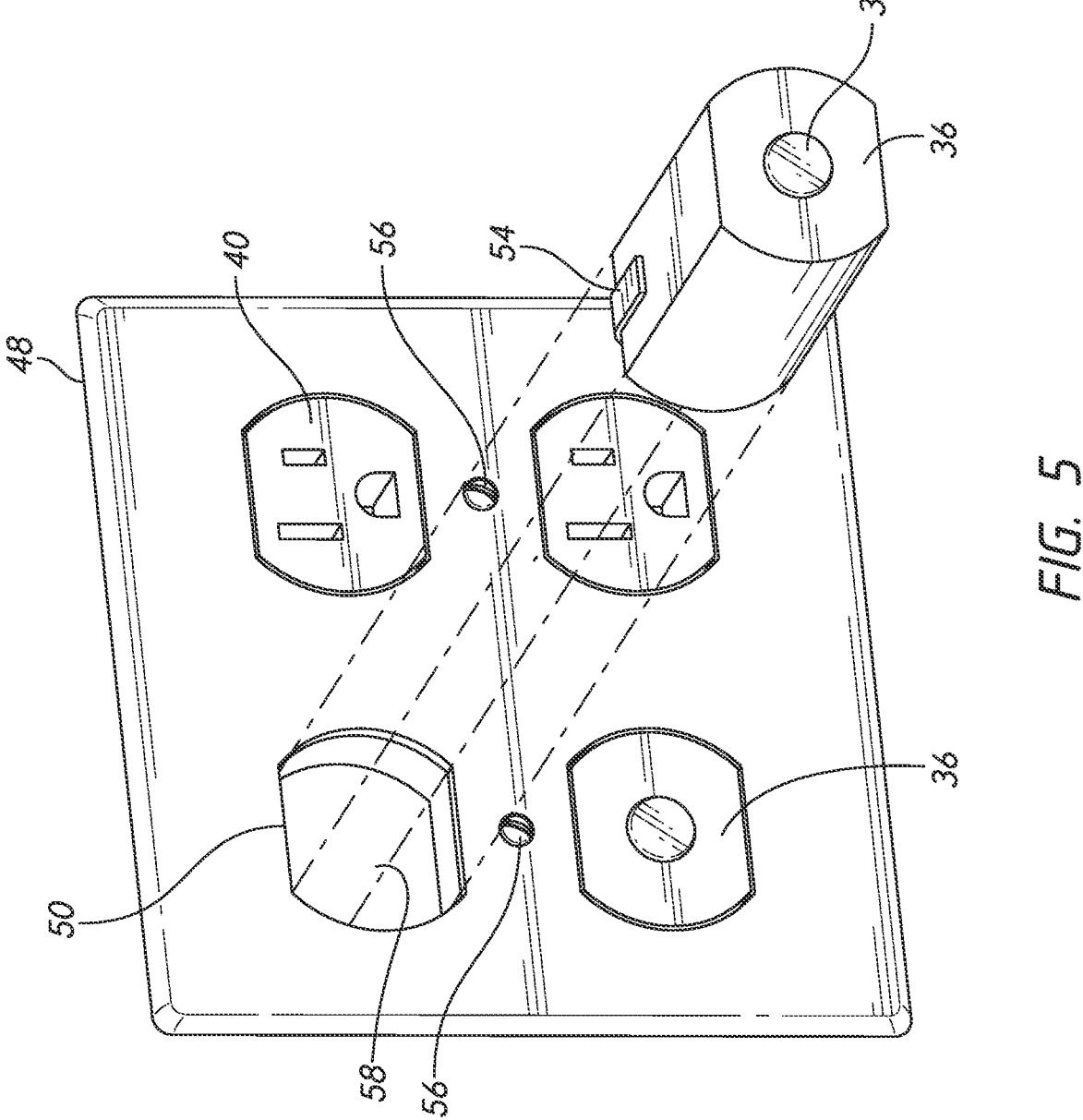
FIG. 5 is an exploded perspective view, showing an embodiment of the invention in an installed state—with the removable surge module being removed.

FIG. 5 shows the surge protector outlet 30 of FIG. 4 installed in an electrical enclosure and covered by a standard cover plate 48. Cover plate 48 extends outward to "dress" the opening and the surge protector outlet. The perimeter of the cover plate extends outward over drywall 22. The reader will note how the two surge protected receptacles 40 are accessible through the openings in cover plate 48—as is the case for conventional electrical receptacles. The two removable surge protector modules 36 are also accessible through the openings in cover plate 48. Surge protector outlet 30 includes two module receivers 58. The upper one of these two is visible in FIG. 5. The reader will note how module receiver 58 is aligned with one of the receptacle openings 50 in cover plate 48 so that removable module 36 can be passed through the receptacle opening. This allows removable module 36 to be removed or installed while surge protector outlet 30 remains in place with cover plate 48 attached.

Figure 7:
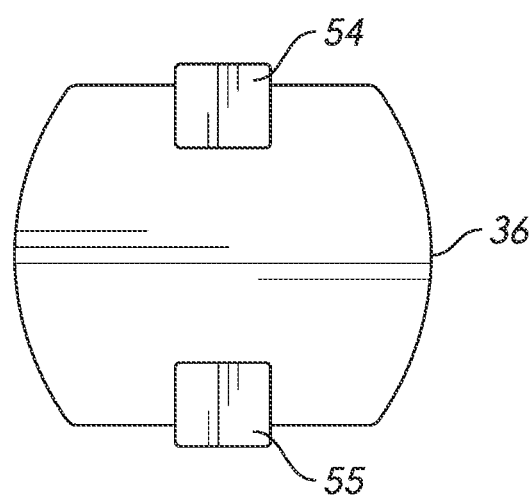
FIG. 7 is an elevation view, showing an exemplary removable surge module.

The electrical connections between removable module 36 and the surge protector outlet are preferably made at the same time as the mechanical connections. FIG. 7 shows a rear elevation view of removable module 36. In the embodiment shown, contacts 54,55 are provided on the rearward facing portion of the module. When the user pushes the removable module into module receiver 58, these contacts 54,55 mate with corresponding contacts within the module receiver to establish an electrical connection between the removable module and the surge protector outlet.

Figure 8:
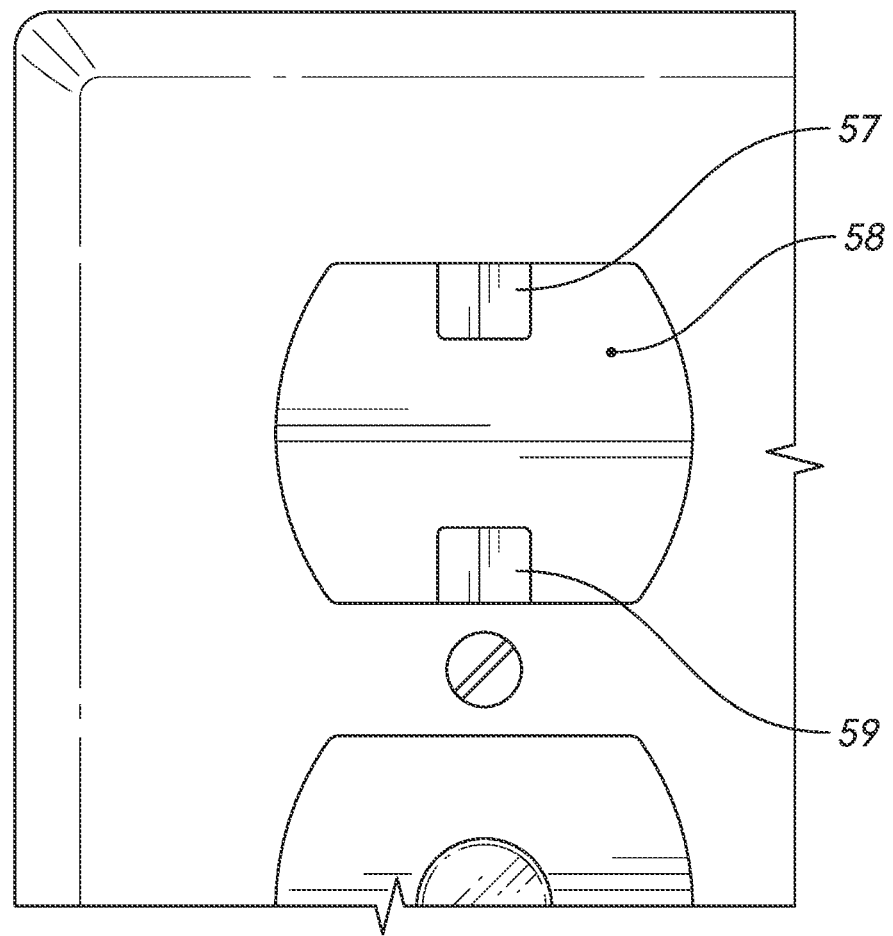
FIG. 8 is an elevation view, showing an exemplary module receiver.

FIG. 8 shows a front elevation view of the configuration of FIG. 5—with removable module 36 removed for visual clarity. Contacts 57,59 are located in the rearward portion of module receiver 58. When the removable module is installed, contacts 54,55 mate to contacts 57,59 and establish the desired electrical connection. At least one of the pairs of contacts are preferably made with resilient material so that a positive connection is made.

Figure 6:
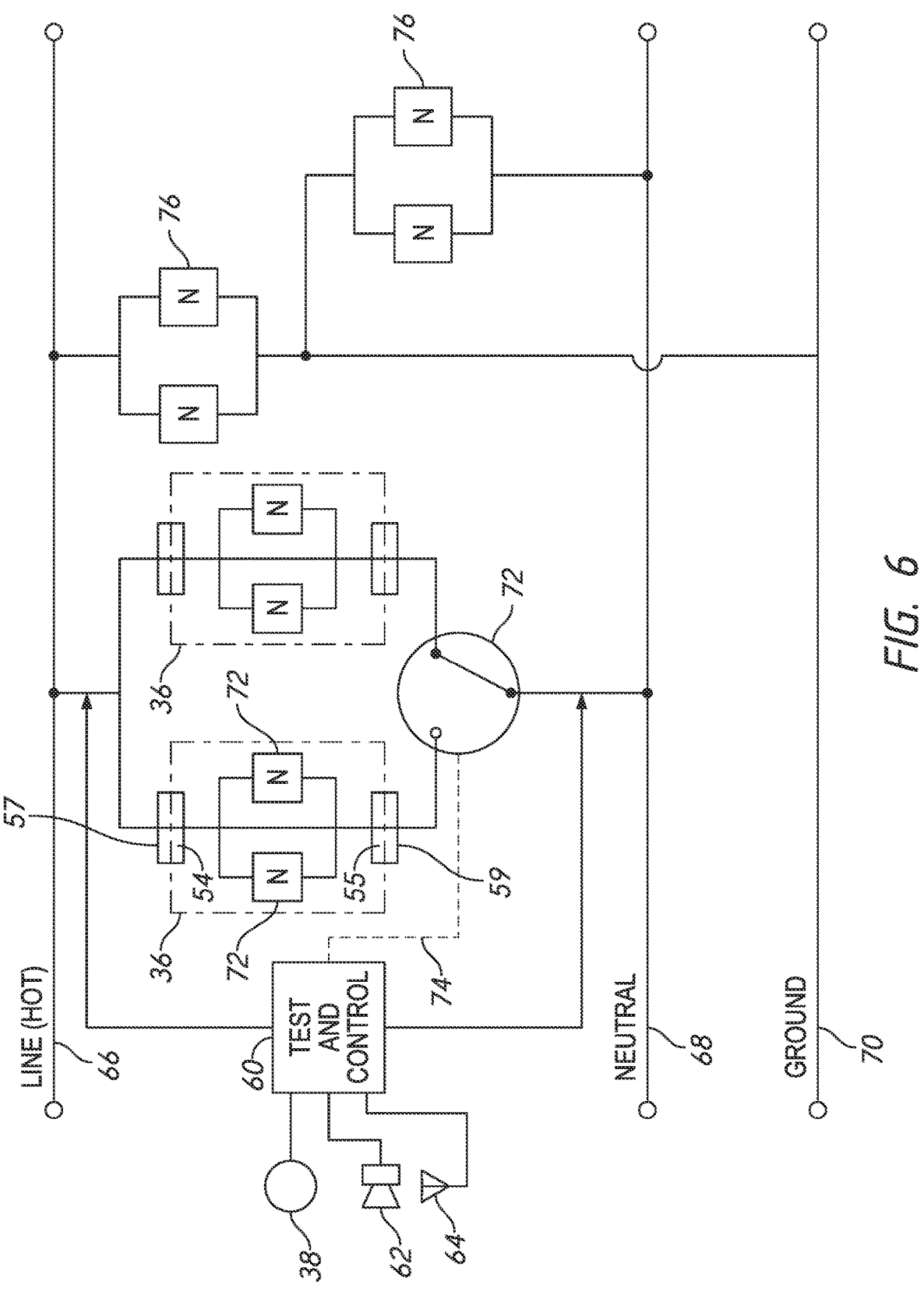
FIG. 6 is a schematic view, showing an exemplary surge protection circuit used in an embodiment of the present invention.

FIG. 6 provides a simplified depiction of the electrical circuits within the surge protector outlet. The present invention is not limited to any particular implementing circuitry, but the simplified example of FIG. 6 should benefit the reader's understanding. The circuit shown is for a "two conductor" AC circuit including a line conductor 66, a neutral conductor 68, and a ground conductor 70. The surge protector circuit uses metal oxide varistors ("MOVs") to absorb line spikes. As is known to those skilled in the art, an MOV has a highly non-linear resistance. An MOV used for surge protection has a high resistance when a normal voltage is applied (such as 110 VAC in the United States) but a much lower resistance when a voltage spike occurs. When subjected to a high-voltage spike, the resistance of the MOV drops dramatically and the MOV acts as a "shunt" between the line and neutral conductors (and sometimes between the line and ground conductors). The spike then travels through the MOV rather than the electronic device being protected.

In the circuit of FIG. 6, the load (typically an electronic device needing protection) is connected on the right. Line power is connected to the circuit on the left. The reader will note how fixed MOVs 76 provide a "shunt" protection capability in the event of voltage spikes. A pair of removable modules 36 contain additional MOVs. The removable MOVs are positioned to protect the fixed MOVs. The fixed MOVs are provided as additional protection in case a spike occurs after the removable MOVs have degraded.

In the version shown two separate removable modules 36 are provided. In a first example, switch 72 selectively connects only one of these two modules at a time. Test and control circuit 60 monitors the condition of the currently selected removable module. Test and control circuit 60 also controls the operation of switch 72. Circuit 60 periodically measures a voltage drop across each of the two removable modules 36. A change in this measured voltage indicates depletion of the MOVs within a removable module. Test and control circuit 60 activates switch 72 to select the module having the greatest spike absorption capability. In some embodiments switch 72 is capable of selecting both removable modules. If both modules test as "healthy," then switch 72 will keep both modules in the circuit.

Test and control circuit 60 preferably also selectively illuminates one or more lights 38 to indicate when a removable module needs to be replaced. These lights may be provided on the removable module itself—as shown in the version of FIG. 5—or on another portion of the surge protector outlet. The test and control circuit optionally includes wireless communication through antenna 64. This allows messaging using an external device such as a smartphone or smart television. The test and control circuit optionally includes speaker 62, which provides a warning tone when a module needs to be replaced. The use of remote communication or a warning tone is advantageous when the surge protector outlet is located behind a large object—such as a flat screen television.

Test and control circuit 60 may be implemented in a wide variety of ways. In the version shown, the circuit includes a processor with an associated memory. The processor retrieves software from the associated memory and runs this software to direct its operations. This allows the test and control circuit to (1) monitor for the presence or absence of a particular removable module, (2) monitor the spike absorption capability of a particular removable module, (3) indicate the need to replace a particular removable module that has been damaged, and (4) activate switch 72 to select one or both of the removable modules.

Those skilled in the art will know that other components are often included in surge protector circuits. Examples, include inductors and capacitors. These are not shown in the simple schematic of FIG. 6.

Returning to the embodiment of FIG. 5, the reader will note how removable module 36 slides out of the assembly in a direction that is approximately parallel to the electrical enclosure's axis of assembly ("approximately" meaning within 30 degrees of parallel). This allows removal while the balance of the surge protector outlet remains in place. Because the removable module is fairly compact (having a depth of preferably less than 40 mm and even more preferably in the range of 20 mm to 30 mm), it is possible to remove and replace the removable module while a wall-mounted television remains in place in front of the surge protector outlet.

It is preferable for the removable module or modules to be easily released by feel—since it is difficult to look behind a mounted television. In the version of FIG. 5, the front portion (most outward portion when installed) of a removable module 36 is positioned to lie approximately flush with the outward surface of cover plate 48. Cover plates are not rigorously standardized, so "approximately flush" means within plus or minus 10 millimeters of flush. A removable module is released by pushing inward on the front portion. The module translates inward—further into the module receiver—and this releases a retaining mechanism that allows the removable module to pop outward so that it protrudes well beyond the outward face of the cover plate. The user then grasps the protruding portion of the removable module and pulls it free.

A replacement removable module is installed by sliding the replacement module in the module receiver until it locks into place. It will remain in place until the user presses inward on the outward portion of the removable module to release it. Alternatively, the removable module can be configured to install with a portion protruding beyond the outward face of the cover plate. For that version, the user removes the module by grasping the protruding portion and pulling the removable module free.

Figure 9:
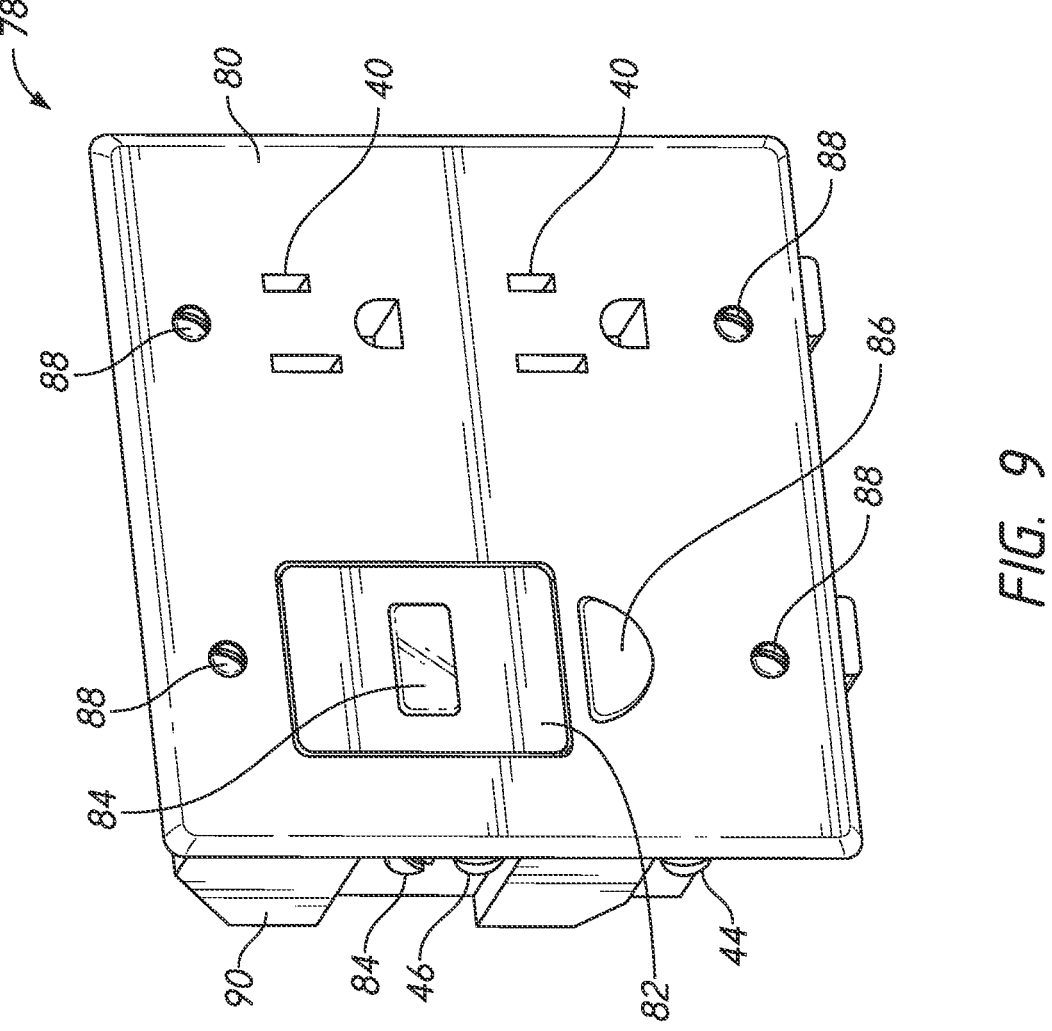
FIG. 9 is a perspective view, showing an alternate embodiment of the present invention.
Figure 10:
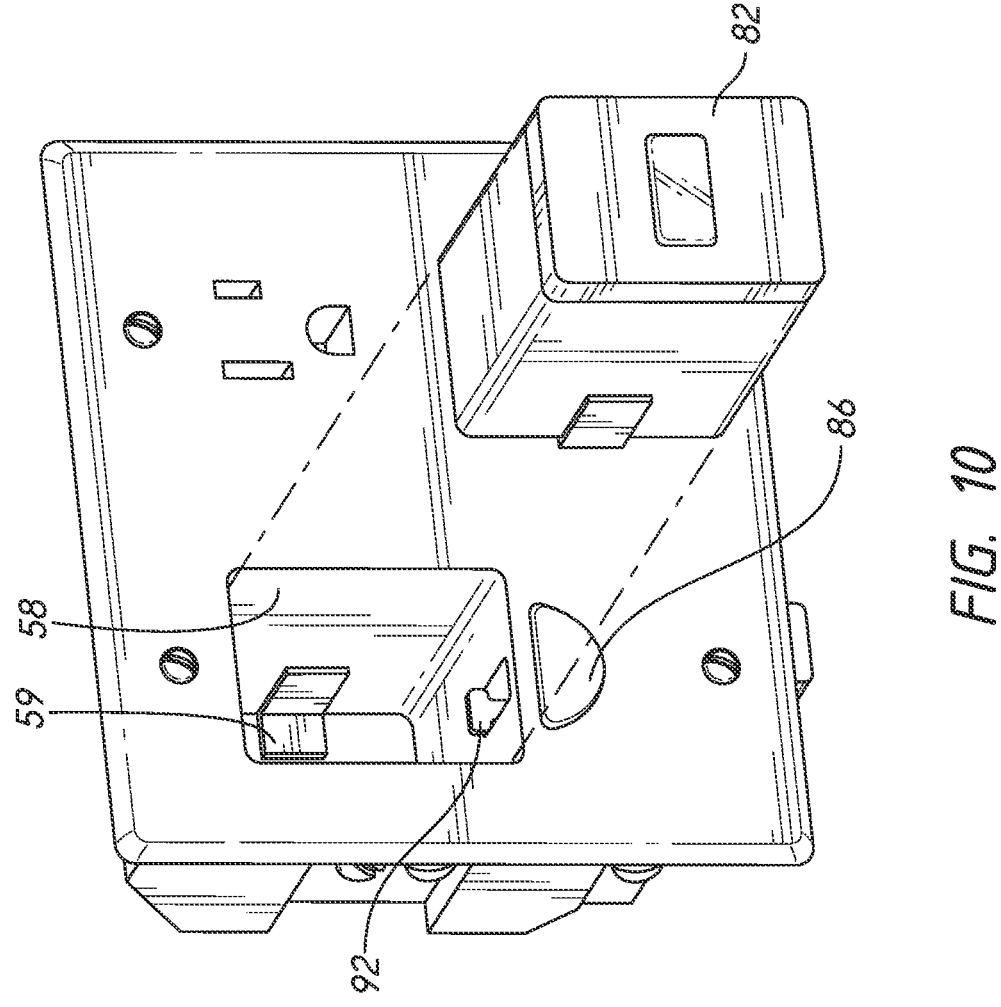
FIG. 10 is an exploded perspective view, showing the embodiment of FIG. 9 with the removable surge module being removed.

In the embodiments of FIGS. 4-8, the surge protector outlet is configured to accept a prior art cover plate over its front face, with the receptacles and removable modules being accessible via the four receptacle openings 50 in a prior art double gang cover plate 48. Other embodiments incorporate the cover plate as part of the surge protector outlet itself. FIGS. 9 and 10 depict this second group of embodiments.

Figure 2:
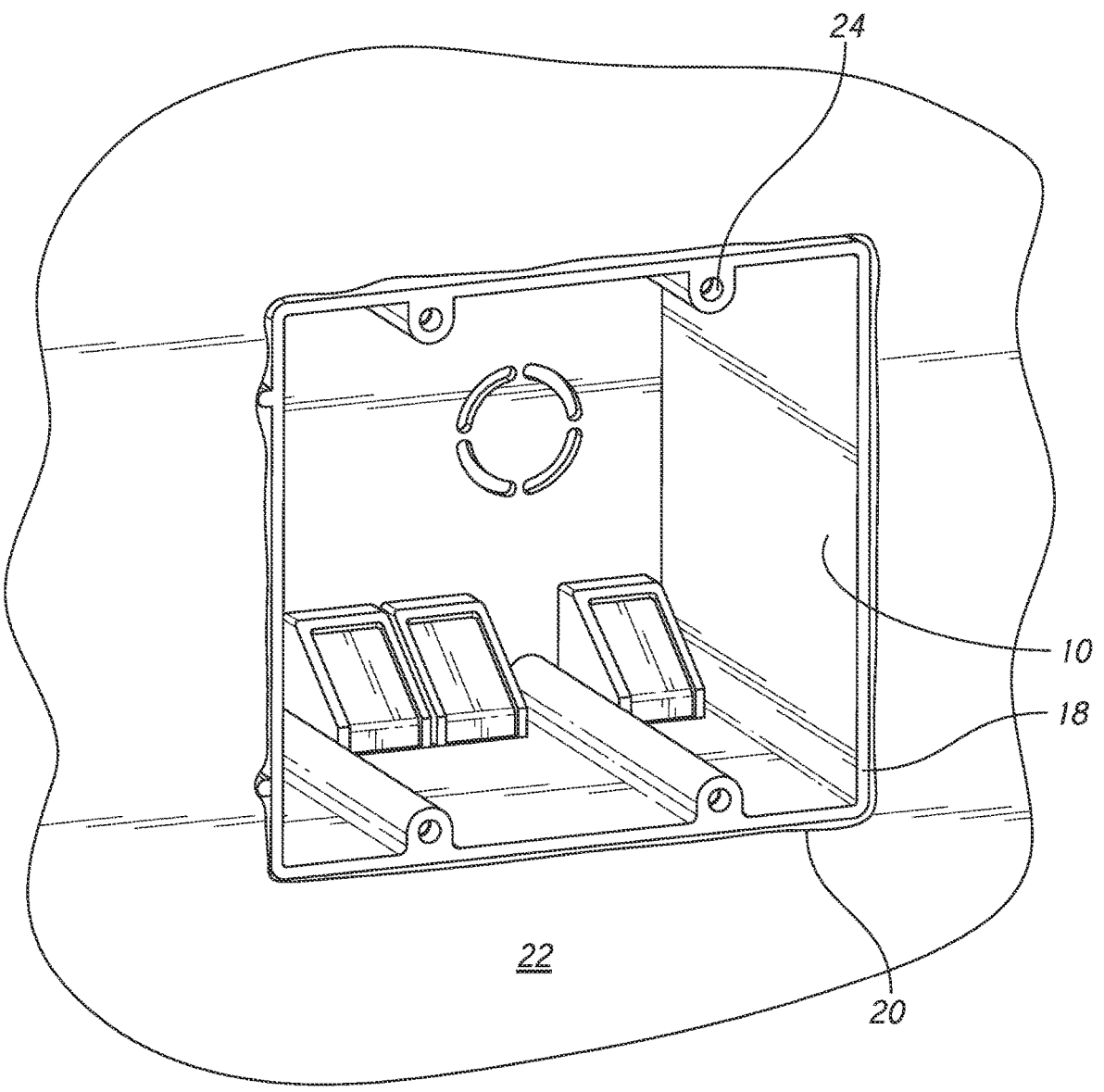
FIG. 2 is a perspective view, showing the enclosure of FIG. 1 after the addition of drywall.
Figure 3:
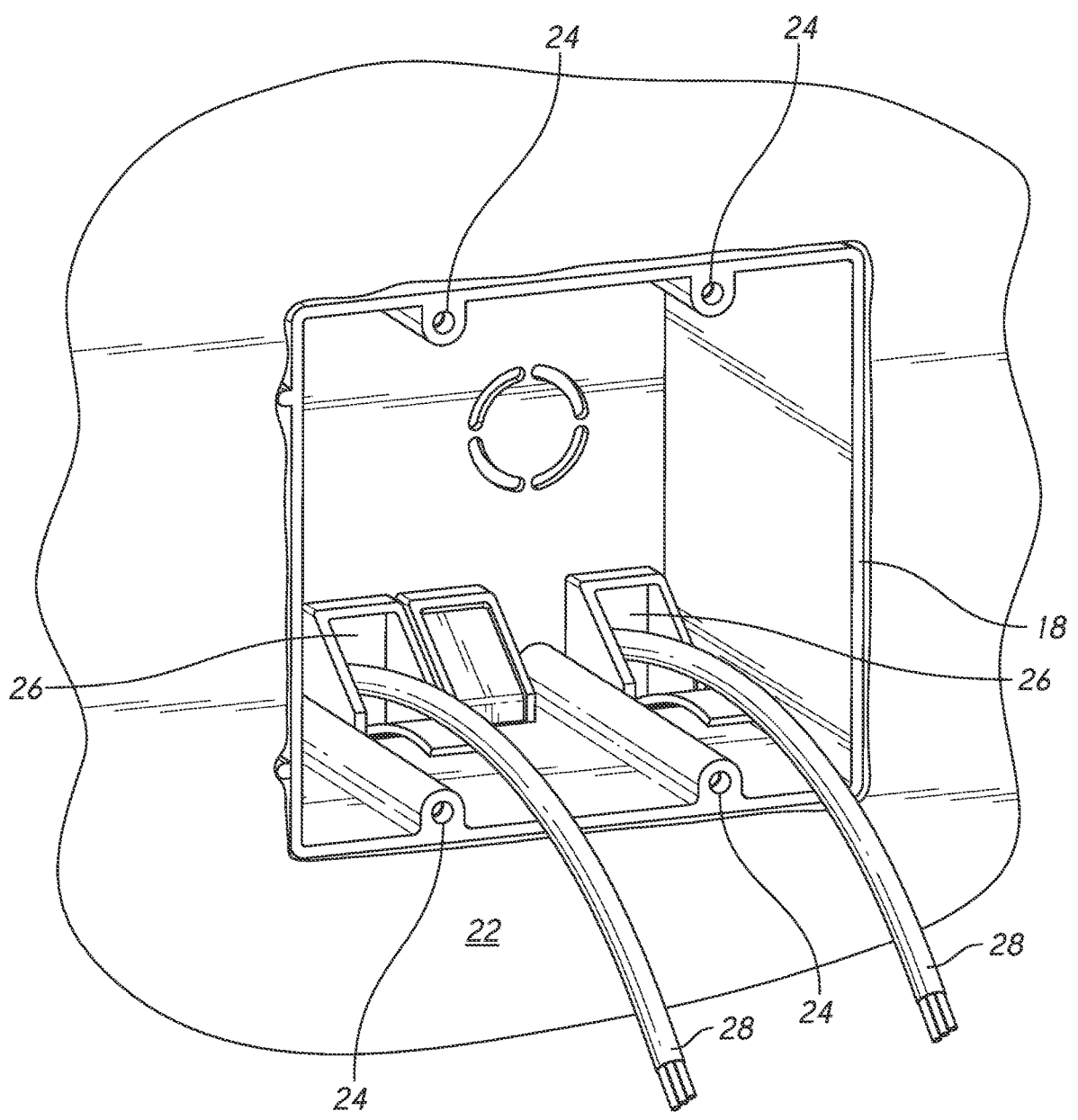
FIG. 3 is a perspective view, showing the enclosure of FIG. 2 with two electrical conductors being pulled into a position suitable for the installation of components within the enclosure.

FIG. 9 shows alternate surge protector outlet 78. Body 90 is sized to slide into a double gang electrical enclosure as shown in FIG. 3. Integrated face plate 80 is joined to body 90. It extends laterally beyond the opening of the double gang enclosure and covers a portion of the wall. It preferably has the same overall height and width as a prior art cover plate 48. The integrated faceplate 80 includes two electrical receptacles 40 as shown. It also includes four holes 80. Holes 80 are positioned to align with the four mounting receivers (see FIG. 2) on a prior art electrical enclosure. Mounting screws can be passed through the holes 88 and into the electrical enclosure to attach surge protector outlet 78 to the electrical enclosure.

Electrical connections are provided as for the embodiment of FIG. 4. These include neutral connectors 46, line connectors (on the opposite side and not visible in FIG. 9), and ground connector 44. A single removable module 82 is provided in the embodiment shown (multiple modules are a possibility as well). Light 84 is provided on a visible portion of the surge suppressor outlet—such as on the front face of the surge protector module itself. Release button 86 is provided to selectively release the removable module 82.

FIG. 10 shows the same assembly with removable module 82 pulled forward from module receiver 58. As for the prior embodiments, electrical contacts on the removable module make contact with electrical contacts within the module receiver when the removable module is in place (contacts 54 and 59 are visible in the view).

Latch 92 engages a recess on the underside of the removable module when the module is pressing into module receiver 58. The latch is released by pressing release button 86. When a user presses the button, the removable module pops forward about 10 mm—protruding out of integrated faceplate 80. The user is able to grasp the protruding portion and pull the module free. A replacement module can be installed by simply pressing it into module receiver 58—whereby latch 92 is again engaged. Thus, it is possible to remove and replace a removable surge protector module while the electrical enclosure and the surge suppressor outlet remains installed in the wall, and in most cases while a television remains installed in front of the surge suppressor outlet.

The invention possibly includes many other features, which can be combined with those already described and with each other. A non-exhaustive listing of these features includes:

1. A removable surge protector module that attaches/detaches in a direction that is perpendicular to the front portion of the surge protector outlet (perpendicular to the axis of assembly for the electrical enclosure);
2. A surge protector outlet that includes power filtration components such as inductors, capacitors, and resistors; and
3. A surge protector outlet that is installed in a standard electrical enclosure using barbed fasteners or quarter-turn fasteners rather than conventional screws.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that follow rather than the examples given.

Having described our invention, we claim:

1. A surge protector including a removable and replaceable surge protector module, comprising:
   (a) a double gang electrical enclosure including,
      (i) a front face,
      (ii) an interior volume opening into said front face,
      (iii) a plurality of mounting receivers,
      (iv) an axis of assembly;
   (b) a surge protector outlet, including,
      (i) a front portion,
      (ii) a surge protected electrical receptacle on said front portion,
      (iii) a module receiver on said front portion, said module receiver being parallel to said axis of assembly of said double gang electrical enclosure,
      (iv) a plurality of mounting holes,
      (v) a second module receiver on said front portion, said second module receiver being parallel to said axis of assembly of said double gang electrical enclosure;
   (c) said surge protector outlet mounted within said interior volume of said double gang electrical enclosure by fasteners passing through said mounting holes in said surge protector outlet and into said mounting receivers in said double gang electrical enclosure;
   (d) a removable surge protector module slidably received within said module receiver on said surge protector outlet, said surge protector module being removable from said surge protector outlet while said surge protector outlet is installed within said double gang electrical enclosure;
   (e) a second removable surge protector module slidably received within said second module receiver on said surge protector outlet, said second surge protector module being removable from said surge protector outlet while said surge protector outlet is installed within said double gang electrical enclosure;
   (f) a test and control circuit automatically sampling a voltage drop across each of said removable surge protectors in order to measure a condition of each of said removable surge protectors; and (g) said test and control circuit automatically switching to said removable surge protector that is in a better condition.

2. The surge protector as recited in claim 1, further comprising an antenna configured to transmit a message to an external device so that a message indicating the need for the replacement of a removable sure protector module can be displayed on such external device.

3. The surge protector as recited in claim 2 wherein said external device is selected from the group consisting of a smart phone or a smart television.

4. The surge protector as recited in claim 1, further comprising:

(a) wherein said removable surge protector module has a front portion that lies approximately flush with a cover plate installed on said surge protector outlet; and (b) wherein said removable surge protector pops outward when said front portion of said removable surge protector is pressed inward, so that said removable surge protector extends outward beyond said cover plate.

5. The surge protector as recited in claim 2, further comprising:

(a) wherein said removable surge protector module has a front portion that lies approximately flush with a cover plate installed on said surge protector outlet; and (b) wherein said removable surge protector pops outward when said front portion of said removable surge protector is pressed inward, so that said removable surge protector extends outward beyond said cover plate.

6. The surge protector as recited in claim 3, further comprising:

(a) wherein said removable surge protector module has a front portion that lies approximately flush with a cover plate installed on said surge protector outlet; and (b) wherein said removable surge protector pops outward when said front portion of said removable surge protector is pressed inward, so that said removable surge protector extends outward beyond said cover plate.

\* \* \* \* \*